United States Patent
Hirono et al.

(10) Patent No.: US 9,177,187 B2
(45) Date of Patent: Nov. 3, 2015

(54) VARIABLE GAIN AMPLIFIER FOR BAR CODE READER

(75) Inventors: Mitsuaki Hirono, Saitama (JP); Naoya Niizeki, Saitama (JP); Depei Ji, Saitama (JP)

(73) Assignee: Optoelectronics Co., Ltd., Saitama (JP)

( * ) Notice: Subject to any disclaimer, the term of this patent is extended or adjusted under 35 U.S.C. 154(b) by 0 days.

(21) Appl. No.: 14/387,439

(22) PCT Filed: Apr. 3, 2012

(86) PCT No.: PCT/US2012/031978
§ 371 (c)(1),
(2), (4) Date: Oct. 10, 2014

(87) PCT Pub. No.: WO2013/151536
PCT Pub. Date: Oct. 10, 2013

(65) Prior Publication Data
US 2015/0060549 A1 Mar. 5, 2015

(51) Int. Cl.
*G06K 7/10* (2006.01)
*G06K 7/14* (2006.01)

(52) U.S. Cl.
CPC ............ *G06K 7/10851* (2013.01); *G06K 7/146* (2013.01); *G06K 7/10554* (2013.01)

(58) Field of Classification Search
CPC ..... G06K 7/10; G06K 7/10851; G06K 7/146; G06K 7/10554
See application file for complete search history.

(56) References Cited

U.S. PATENT DOCUMENTS

| 4,101,784 | A | 7/1978 | Key et al. |
| 5,028,771 | A | 7/1991 | Yang |
| 5,449,893 | A | 9/1995 | Bridgelall et al. |
| 5,475,206 | A | 12/1995 | Reddersen et al. |
| 5,533,046 | A | 7/1996 | Lund |
| 5,550,362 | A | 8/1996 | Sherman |
| 6,126,075 | A * | 10/2000 | Agabra et al. ............... 235/454 |
| 6,478,225 | B1 * | 11/2002 | Swartz et al. ............ 235/462.22 |
| 6,811,087 | B2 | 11/2004 | Nakamura et al. |
| 7,354,000 | B2 | 4/2008 | Nakano et al. |
| 7,526,130 | B2 | 4/2009 | Hayakawa et al. |
| 8,820,645 | B2 * | 9/2014 | Giebel et al. ............ 235/462.22 |
| 2004/0004127 | A1 | 1/2004 | Nakamura et al. |
| 2006/0016893 | A1 | 1/2006 | Barkan et al. |
| 2007/0273794 | A1 | 11/2007 | Sprague et al. |
| 2009/0084853 | A1 | 4/2009 | Giebel et al. |

OTHER PUBLICATIONS

Officer: Jacqueline Pitard, "Related International Patent Application No. PCT/US2012/024057", "International Search Report and Written Opinion", Oct. 2, 2013, Publisher: PCT, Published in: EP.
(Continued)

*Primary Examiner* — Sonji Johnson
(74) *Attorney, Agent, or Firm* — Brundidge & Stanger, P.C.

(57) ABSTRACT

A system and method for controlling an amplifier in a bar code reader are disclosed, wherein the method may include receiving light at a photodiode within the bar code reader from a bar code being scanned by a scan mirror powered by a scan motor; converting the received light into an initial electrical signal; determining whether the scan motor is undergoing a change in direction; establishing a gain value for the amplifier based on an outcome of the determining step; and amplifying the initial electrical signal into an amplified signal using the established gain value.

13 Claims, 6 Drawing Sheets

(56) References Cited

OTHER PUBLICATIONS

Examiner: Blaine R. Copenheaver, "Parent International Patent Application No. PCT/US2012/031978", "International Search Report and Written Opinion", Jun. 25, 2012, Publisher: PCT/ISA, Published in: US.

Examiner: Schauler, Markus, "Related International Patent Application No. PCT/US2013/024057", "International Preliminary Report on Patentability", Aug. 14, 2014, Publisher: PCT/ISA, Published in: EP.

Examiner: Philippe Becamel, "Related International Application No. PCT/US2012/031978", "International Preliminary Report on Patentability", Oct. 16, 2014, Publisher: IB of WIPO, Published in: CH.

* cited by examiner

VARIABLE GAIN AMPLIFIER FOR BAR CODE READER

RELATED APPLICATIONS

This application is related to U.S. application Ser. No. 13/363,894, filed Feb. 1, 2012, entitled "System and Method for Noise Reduction in a Bar Code Signal" which is hereby incorporated herein by reference in its entirety.

BACKGROUND OF THE INVENTION

A transition from fluorescent and other forms of traditional lighting to Light Emission Diode (LED) illumination is occurring in various environments including retail outlets, office buildings, warehouses, hospitals, and private homes. LED illumination may provide the benefits of low power consumption, low running cost, long life, and high color rendering effect among other desirable features. Some nations are now moving to ban further manufacture of conventional light bulbs for environmental reasons.

Bar code readers are commonly used in retail environments, including convenience stores, supermarkets and the like. Generally, a laser-scanned barcode reader operates by sweeping a laser beam, commonly having a 650 nm wavelength, over a bar code and receiving light energy reflected from the bar code, which is processed to generate a bar code signal. In a typical application, a laser beam using a 100 Hz scan rate will produce a signal having a frequency range of 30 kHz (kilohertz) to 200 kHz, depending on the resolution of the bar code and the read distance (the distance from the bar code to the bar-code reader).

To suppress power consumption, LED bulbs are generally driven at a frequency within a range of about 30 kHz to 100 kHz, a range which overlaps with the frequencies of many bar code signals. It would be hard for a bar code reader to distinguish light energy from ambient light from light energy from a bar code signal if the frequency ranges of the two signal types overlap. To eliminate interference of the ambient light with bar code readers, U.S. Pat. No. 6,811,087, which is incorporated by reference herein, discloses a technique to scan a bar code using a pulsed laser at a frequency of 2 MHz (megahertz) and using a synchronous detector to detect this frequency and preferably no other frequencies. This technique significantly removes ambient light having a constant intensity (such as sunlight) and light energy from high frequency L.E.D. illumination. However, where there are ambient light frequency components in common with a bar code signal, the decoder within the bar code reader could misread ambient light as being part of a bar code signal, which could lead to a signal reading failure.

Moreover, other possible sources of noise may be present in bar code reading environments as discussed in the following. Laser-scanned bar code readers commonly have exit windows made of glass or plastic (i.e., polycarbonate, Polymethyl methacrylate material) to protect the sensitive parts inside the reader housing. Although coated with an anti-reflective film, dirt or a finger-print on the exit window would present an optical obstruction resulting in significant backscatter light being directed toward the photo sensor. The back-scattering of light would be more severe in a retro-reflective type barcode reader, in which the outgoing laser beam and the collected light beam received by the reader share the same optical path. Whereas the signal intensity from a bar code at a distance of 300 to 500 mm has a magnitude of about 0.1 uW (microwatts), the back scatter light could reach a magnitude of 1 uW, which is ten times the magnitude of the bar code signal. The above-described situation may thus lead to an inability of the bar code reader to accurately read a bar code. Accordingly, suitable amplification of the bar code signal is desirable.

Existing preamplifier circuits have amplifier controllers that provide feedback resistance that is controllable based on the magnitude of the output signal. When the output magnitude causes the amplified signal to reach the saturation point of the circuit, the resistance used as part of the amplification circuit is decreased to a smaller value by adding resistor in parallel to the feedback resistance, to lower the output to a level below the saturation level. However, the resistance remains at a larger value if the output is safely below the circuit saturation level, in order to maintain a high signal-to-noise ratio. The feedback resistance can be altered such that the output always reaches a predetermined maximum value.

The existing art also discloses a low pass filter coupled to an amplifier as described above for transmitting therethrough a low-frequency component of the voltage signal amplified by the preamplifier. A thresholding function may be implemented such that if the output signal of the low pass filter is lower than a predetermined level, the output is brought to a zero level. A function may be implemented to linearly increase the magnitude of the output signal when the output signal is equal to or higher than a selected predetermined level.

Using an existing approach, two or more different feedback resistance values are switched depending on scanned signal levels. When the feedback resistance is switched, the signal level variation becomes larger, and if the switching occurs during bar code scanning, the switching action may lead to ambiguity in determining whether a received bar code signal corresponds to a "bar" or "no-bar" condition within the bar code being scanned.

A low-pass filter (LPF) may be used to resolve the signal interpretation issue discussed above. However, it is difficult to ensure that the LPF is tuned with sufficient precision to ensure accurate interpretation of signals that are received as the resistance values are in the midst of being altered. Accordingly, there is a need in the art to ensure that ambiguity in interpreting signal values from a bar code reader is not generated by altering the gain of an amplification circuit while reading a bar code.

SUMMARY OF THE INVENTION

According to one aspect, the invention is directed to a method for controlling an amplifier in a bar code that may include receiving light at a photodiode within the bar code reader from a bar code being scanned by a scan mirror powered by a scan motor; converting the received light into an initial electrical signal; determining whether the scan motor is undergoing a change in direction; establishing a gain value for the amplifier based on an outcome of the determining step; and amplifying the initial electrical signal into an amplified signal using the established gain value.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

An embodiment of the present invention is directed to adjusting the gain of an amplifier within a bar code reader based on one or more of the following inputs: (a) a voltage level of the signal emerging from the subject amplifier being at or exceeding a low-level threshold or a high-level threshold; and/or (b) an indication that the direction of motion of a scan mirror of the bar code reader has changed. The amplifier gain may be changed by adjusting the feedback resistance connected in parallel with an operational amplifier (op-amp) used in an amplifier, which may be a pre-amplifier in the electrical signal processing circuitry of the bar code reader.

Figure 1:
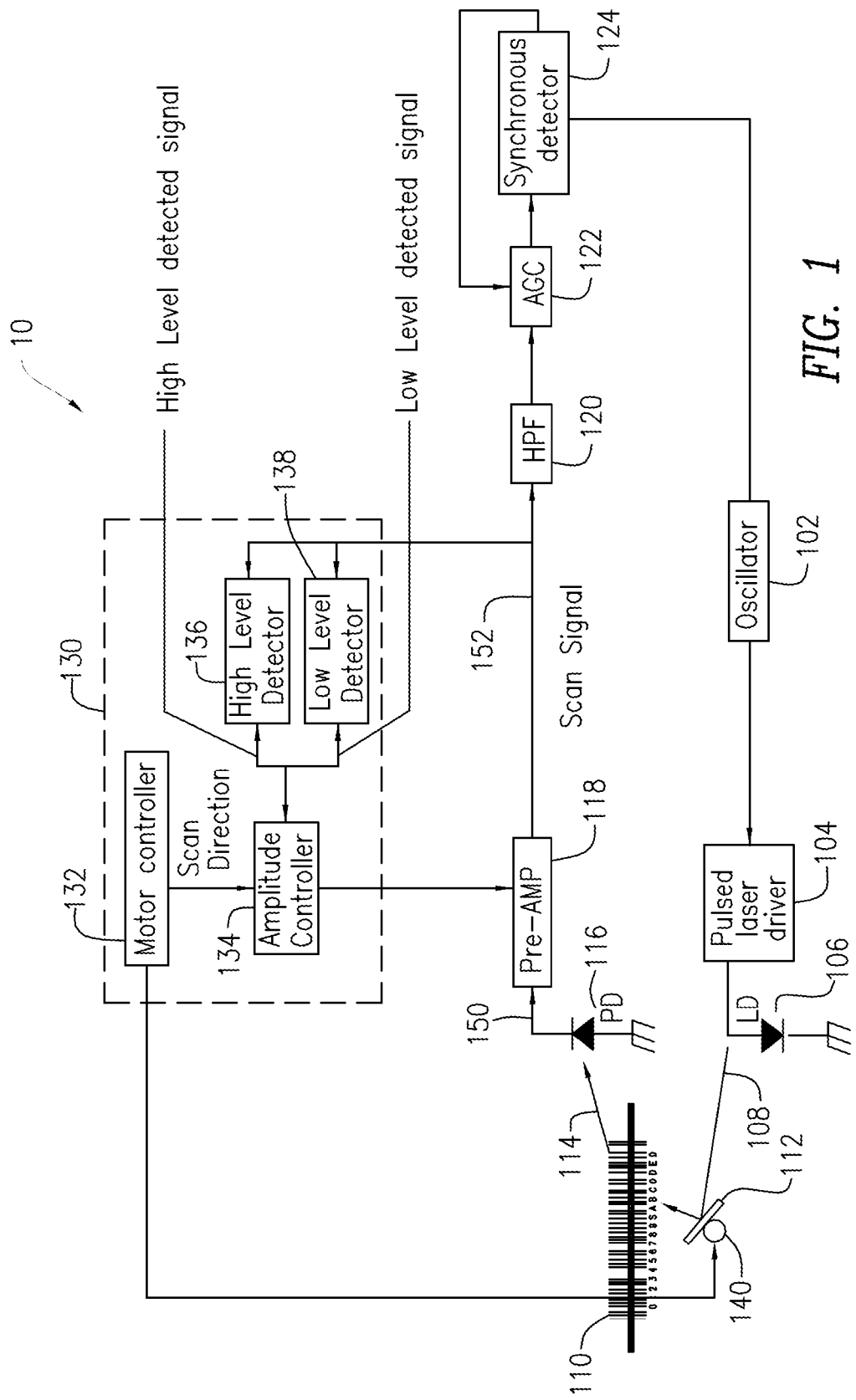
FIG. 1 is a schematic diagram of a bar code reader incorporating an amplifier control circuit in accordance with one or more embodiments of the present invention.

FIG. 1 is a schematic diagram of a bar code reader 10 incorporating an amplifier control circuit 130 (also referred to herein as an amplifier controller) in accordance with one or more embodiments of the present invention. Bar code reader 10 may include laser diode 106, pulsed laser driver 104, oscillator 102, scan mirror 112, scan motor 140, photodiode 116, pre-amplifier 118, amplifier control circuit 130, high-pass filter 120, automatic gain control circuit 122 and/or synchronous detector 124. Laser diode 106 may emit outgoing laser beam 108, and light beam 114 may be received within bar code reader 10 from bar code 110.

Figure 1A:
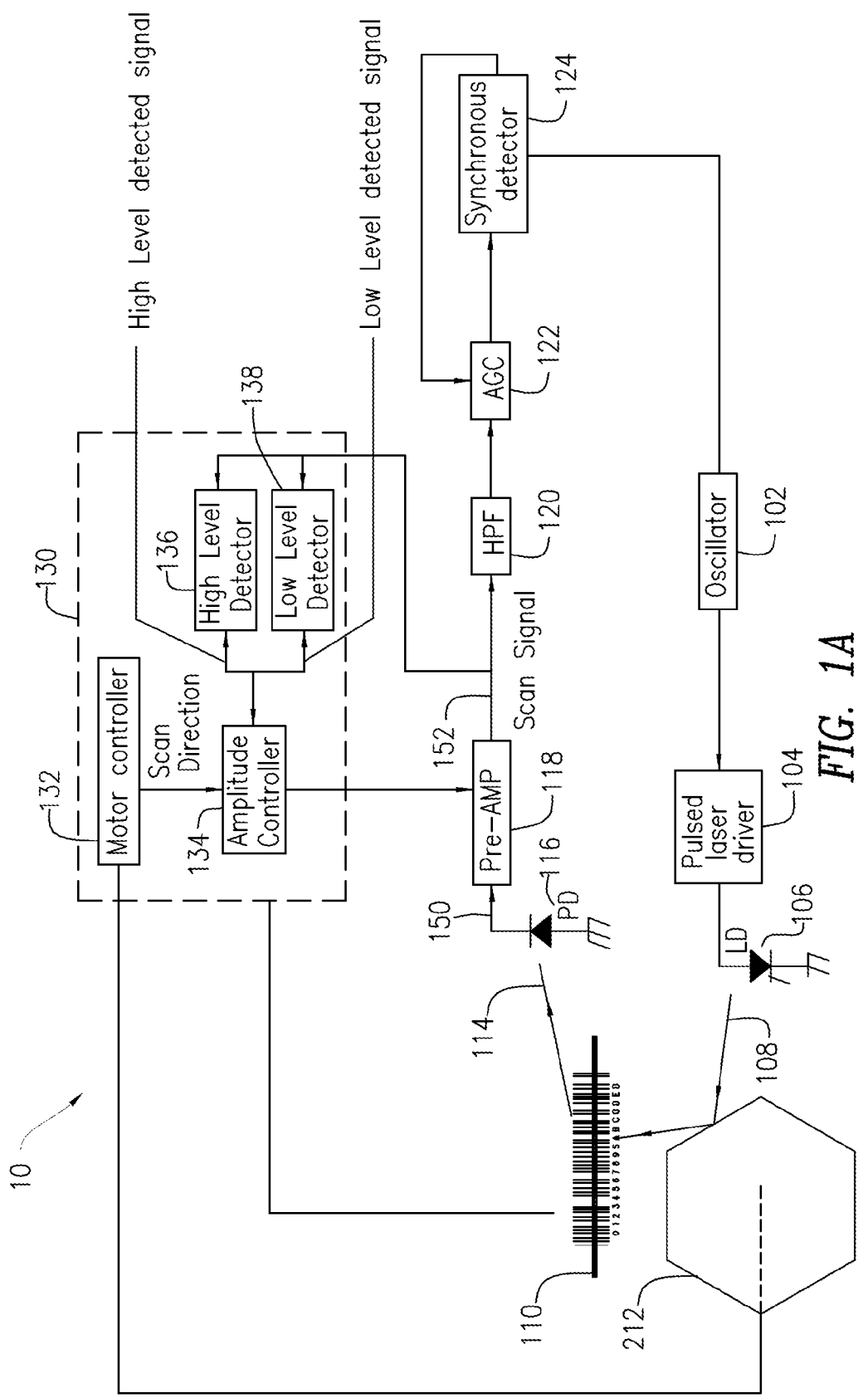
FIG. 1A is a schematic diagram of a bar code reader in which a polygon mirror has been substituted for the reciprocating mirror of FIG. 1, in accordance with an embodiment of the present invention.

FIG. 1A is a schematic diagram of a bar code reader 10 in which a polygon mirror 212 has been substituted for the reciprocating mirror 112 of FIG. 1, in accordance with an embodiment of the present invention. In the view provided by FIG. 1A, polygon mirror 212 may be rotated counterclockwise to cause the beam reflected from laser diode 106 to scan over the length of bar code 110. Once any given scan reaches its conclusion, the location of the reflected beam from laser diode 106 may be reset as a subsequent flat surface of the polygon rotates into position and starts scanning from the rightmost part of bar code 110, and once again scans over the entire bar code 110, as polygon mirror 212 rotates counterclockwise.

Returning to FIG. 1, amplifier control circuit 130 may include motor controller 132, amplitude controller 134, high-level detector 136 (for detecting an upper limit for the magnitude of the amplified signal 152 (FIG. 2)), and/or low-level detector 138 (for detecting a lower limit for the magnitude of the amplified signal 152 (FIG. 2)). A method that may be implemented within amplitude controller 134 is discussed in connection with FIG. 3, later herein. In one embodiment, low level detector 138 may use a detection threshold of about 500 millivolts, and high level detector 136 may use a detection threshold of about 1.52 volts. However, the present invention is not limited to the above-disclosed thresholds. Threshold values, for low level detection and/or for high level detection, lower than, or higher than, the above-disclosed thresholds may be used, and all such variations are intended to be included within the scope of the present invention.

Amplitude controller 134 may be implemented with a programmable computer having communication interfaces with detectors 136 and 138, motor controller 132, and/or amplifier 118. Alternatively, amplitude controller 134 may be implemented with logic incorporated into digital circuitry, instead of with software running on a programmable computer.

Figure 2A:
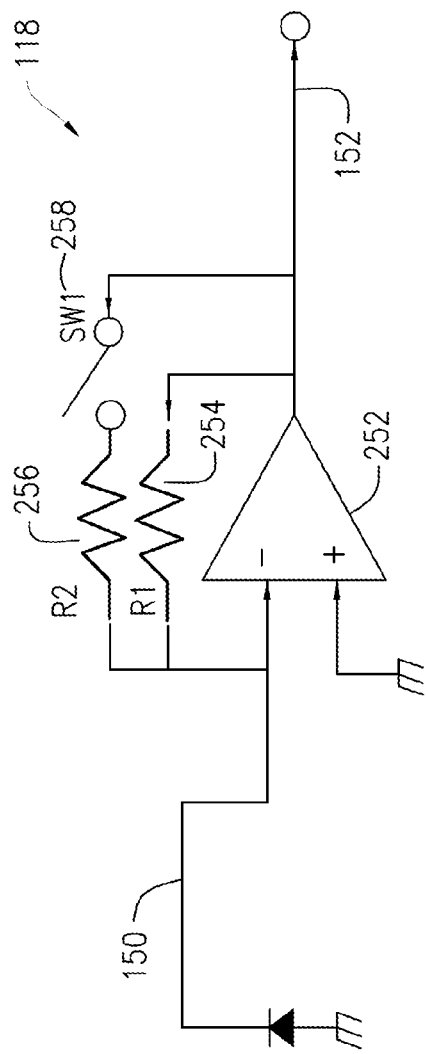
FIG. 2A is a schematic diagram of circuit for implementing variable feedback resistance in an amplifier, in accordance with an embodiment of the present invention.

FIG. 2A is a schematic diagram of an amplifier 118 in accordance with an embodiment of the present invention. When only R1 254 is connected in parallel with op-amp 252, the resistance in at a high level (equal to the resistance value of R1 itself). When switch 258 is activated so as to close the connection running through R2 256, the effective resistance connected in parallel with op-amp 252 is the parallel equivalent resistance of R1 and R2 which may be determined according to mathematical formulae that are known in the art. In one embodiment, the high-amplitude resistance may be about 3 mega-Ohms (i.e. three million ohms), which may be achieved by employing an R1 value of 3 mega-ohms. In this same embodiment, the low-amplitude resistance value may be 200 kilo-ohms (i.e. two hundred thousand ohms). A low-amplitude resistance value of 200 kilo-ohms may be obtained by employing a value of R2 equal to about 200 kilo-ohms. However, the present invention is not limited to the use of the above-specified resistance values for R1 254 and R2 256.

Figure 2B:
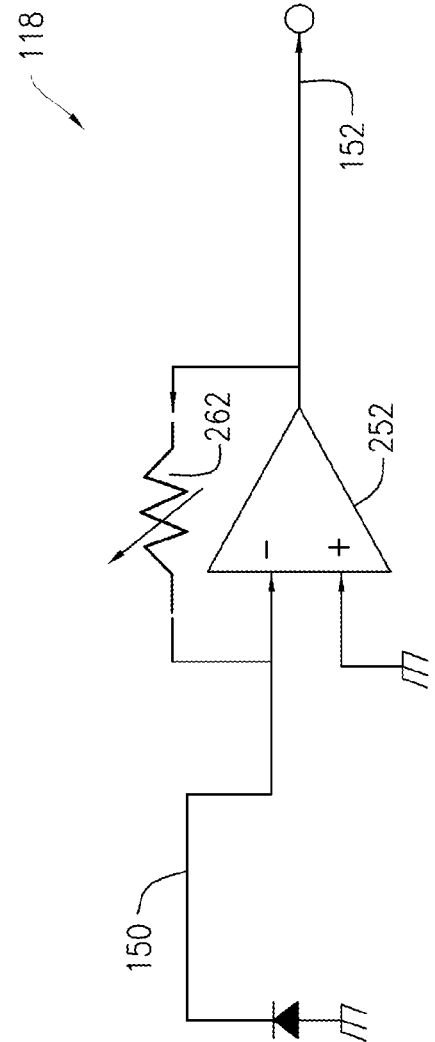
FIG. 2B is a schematic diagram of circuit for implementing variable feedback resistance in an amplifier, in accordance with another embodiment of the present invention.

FIG. 2B shows an alternative way of implementing amplifier 118. In the embodiment of FIG. 2B, variable resistor 262 is used in place of the switchable resistor arrangement shown in FIG. 2A. Variable resistor 262 may be implemented using an active solid-state electronic circuit. Alternatively, variable resistor 262 may be implemented using a passive resistance element and a mechanism for adjusting the point along the passive resistance element at which electrical contact is made with an current path joining a left-side node of op-amp 252 with a right-side node of op-amp 252. Moreover, the present invention is not limited to the above-discussed ways of implementing amplifier 118.

Figure 3:
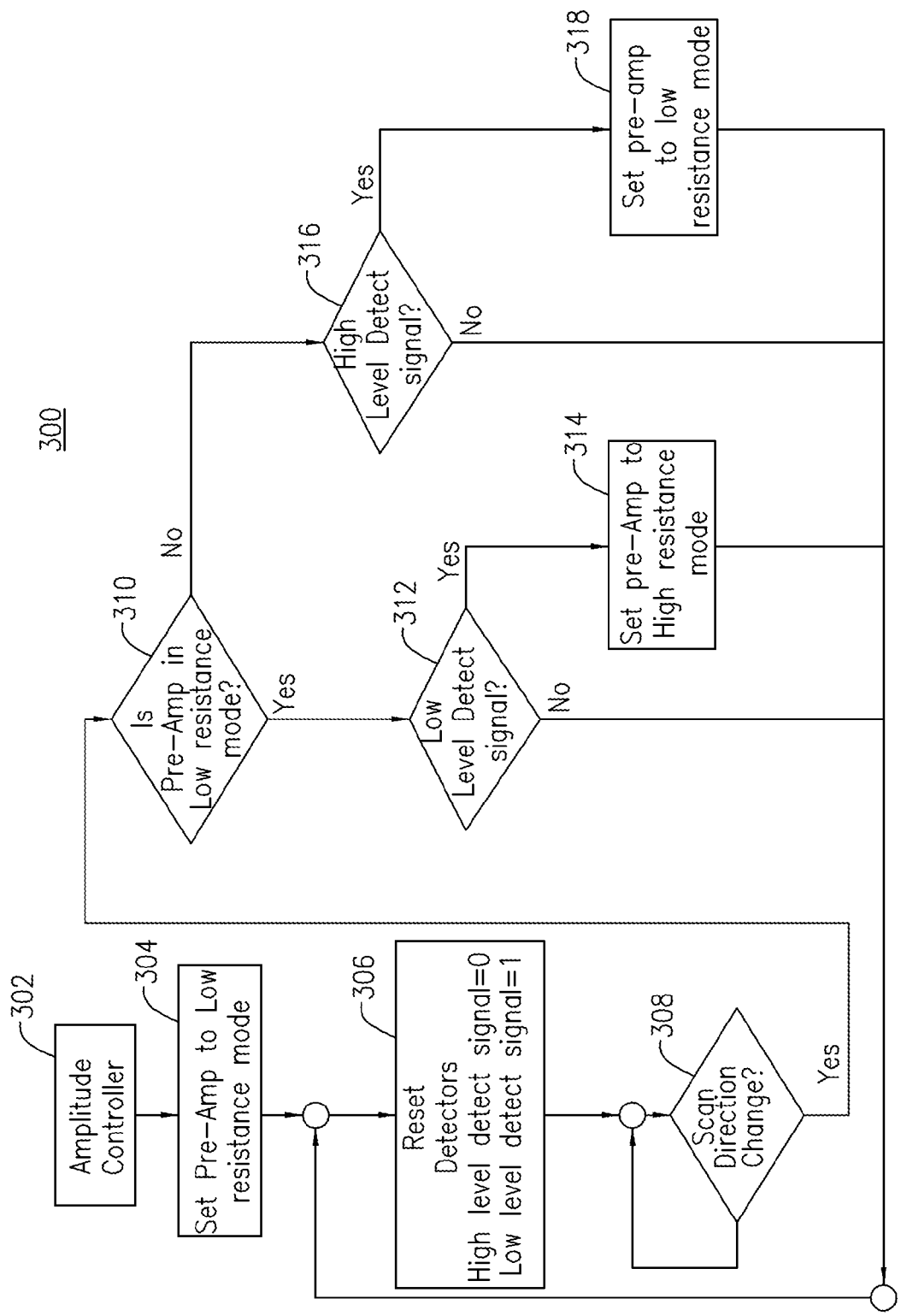
FIG. 3 is a block diagram of a method for controlling the operation of an amplifier in accordance with an embodiment of the present invention.

FIG. 3 is a block diagram of a method 300 for controlling the operation of an amplifier 118 in accordance with an embodiment of the present invention.

Amplitude controller 134 may be activated (step 302), may set pre-amplifier 118 to a low resistance mode of operation (step 304), and may reset detectors 136 and 138 to initial conditions such that high-level detector 136 is set to "0" and low-level detector 138 is set to "1". At step 308, the method 300 preferably determines whether the direction in which scan motor 140 has changed. If there is no change in scan direction, step 308 is repeated. If there has been a change in the direction of scan motor 140, method 300 preferably continues at step 310. An indication of a change in scan direction may by scan motor 140, or by a sensor configured to sense the direction of rotation of a shaft coupled to scan motor 140. Prior to discussing step 310, various mechanisms for notifying amplitude controller 134 of the occurrence or non-occurrence of a change in scan direction are discussed below.

In an alternative embodiment step 308 may include determining that there has been transition from one scan operation over bar code 110 to a subsequent scan operation. However, the transition may be detected differently depending on whether the flat mirror 112 of FIG. 1 or the polygon mirror 212 of FIG. 2 is used. In the embodiment of FIG. 1, detection of the transition from one scanning process to the next may be identified by detecting a change in the scan direction of mirror 112, as discussed above. In the embodiment of FIG. 1A, which employs polygon mirror 212, a transition from one complete scan to a subsequent scan may be detected using a rotary position encoder coupled to polygon mirror 212.

The indication of a change in the direction of scan mirror 112 may be provided by having motor controller 132 transmit a signal to amplitude controller 134 indicating a change in the direction of motion of scan motor 140 substantially simultaneously with the transmission of control signaling from motor controller 132 to motor 140 that actually changes the direction of motor 140. Alternatively, a sensor could be built into scan mirror 112 which emits a signal indicative of a change in direction whenever scan mirror transitions from one scanning direction to another. Moreover, the present invention is not limited to the above means of informing amplitude controller 134 of a change in scan direction.

At step 310, the method determines whether or not the pre-amp 118 is operating in a low-resistance mode, as previously discussed in connection with FIGS. 2A and 2B.

If pre-amp 118 is in the low-resistance mode, (i.e. the "yes" condition output from block 310) the method determines, at step 312, whether the output signal 152 (FIG. 2) has reached a low enough value to cause the low-level detection signal to be set high by low-level detector 138. If the low-level detection signal is low, meaning that the output signal 152 is above the low-level detection threshold, no further action is taken, and the execution of method 300 may resume at step 306. If the low-level detection signal is high (the "yes" output from block 312), the pre-amp 118 is preferably shifted into the high-resistance mode (discussed in connection with FIG. 2) in step 314. Thereafter, the method 300 may resume at step 306.

We now return to the "no" branch output from block 310. If pre-amp 118 is in low-resistance mode, the method 300 preferably checks to see whether the high-level detector 136 indicates that signal 152 has reached or surpassed the high level voltage threshold. If the high-level detection threshold has not been reached, the method 300 preferably resumes at step 306. If the high-level detection threshold has been reached, the method 300 preferably causes pre-amp 118 to operate in the low-resistance mode, at step 318. Thereafter, the method 300 preferably resumes operation at step 306.

Figure 4:
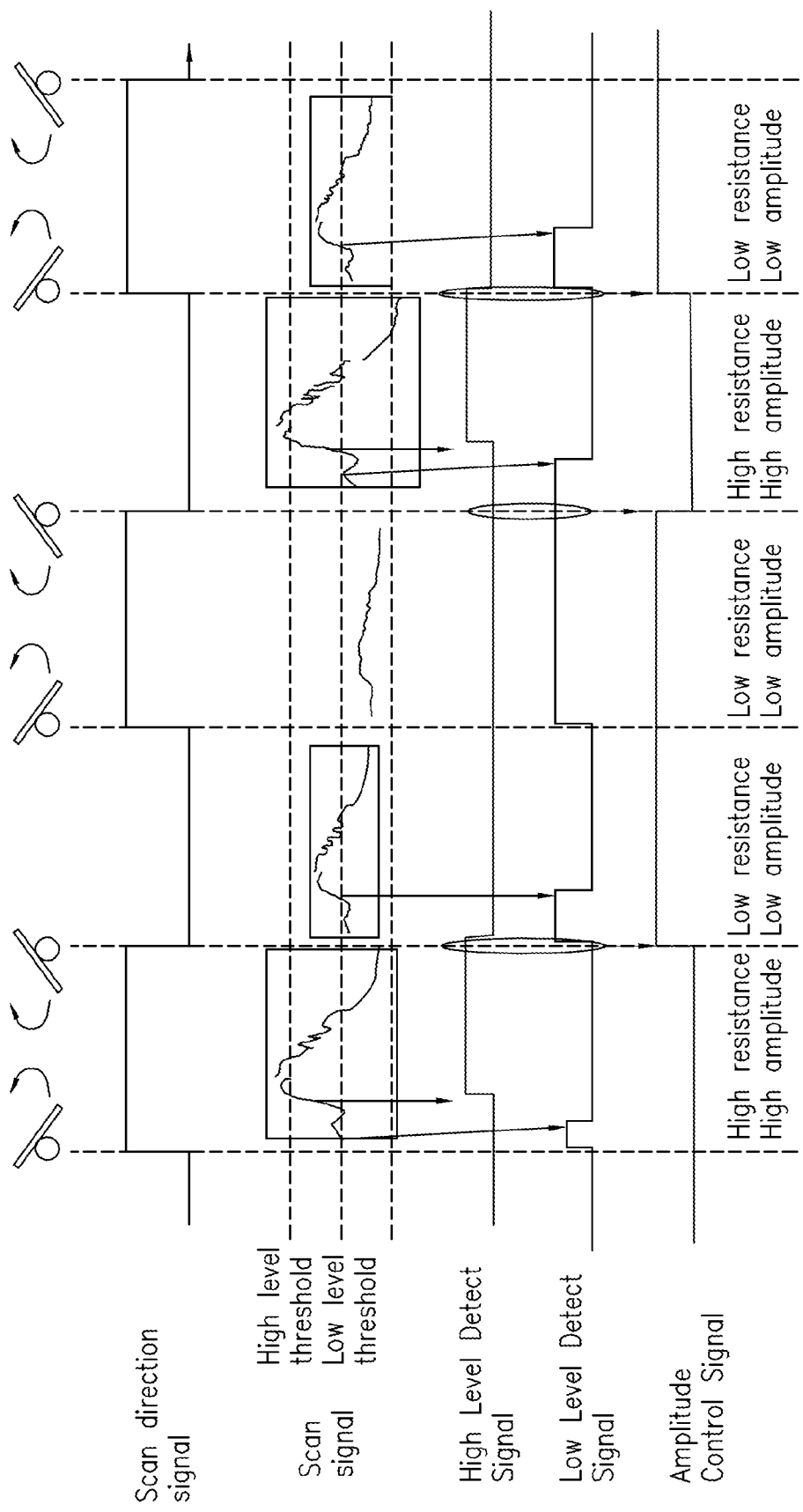
FIG. 4 is a chart showing the interactions between various conditions within the bar code reader of FIG. 1, in accordance with an embodiment of the present invention.

FIG. 4 is a chart showing the relationship between changes in scan direction and switching of the feedback resistance in pre-amp 118 in accordance with one embodiment of the present invention.

Figure 5:
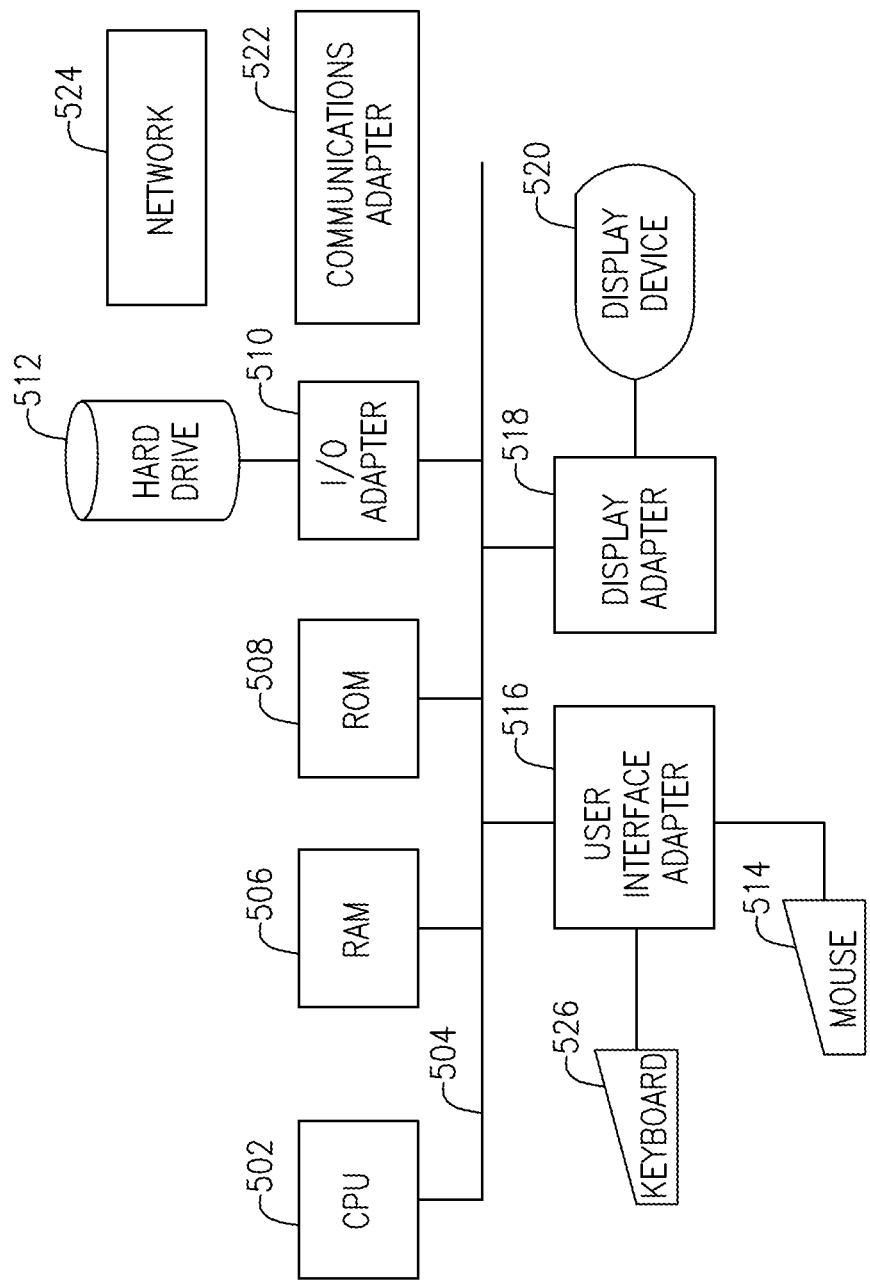
FIG. 5 is a block diagram of a computer system adaptable for use with an embodiment of the present invention.

FIG. 5 is a block diagram of a computing system 500 adaptable for use with one or more embodiments of the present invention. Central processing unit (CPU) 502 may be coupled to bus 504. In addition, bus 504 may be coupled to random access memory (RAM) 506, read only memory (ROM) 508, input/output (I/O) adapter 510, communications adapter 522, user interface adapter 506, and display adapter 518.

In an embodiment, RAM 506 and/or ROM 508 may hold user data, system data, and/or programs. I/O adapter 510 may connect storage devices, such as hard drive 512, a CD-ROM (not shown), or other mass storage device to computing system 500. Communications adapter 522 may couple computing system 500 to a local, wide-area, or global network 524. User interface adapter 516 may couple user input devices, such as keyboard 526, scanner 528 and/or pointing device 514, to computing system 500. Moreover, display adapter 518 may be driven by CPU 502 to control the display on display device 520. CPU 502 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for controlling gain in an amplifier within a bar code reader, the system comprising:
   a scanner for directing light at a bar code, wherein the scanner is configured to scan over the bar code in a first direction and then in a second direction opposite the first direction;
   a photodiode for converting light received at the bar code reader from the bar code into an initial electrical signal;
   an amplifier for producing an amplified signal from the initial electrical signal; and
   an amplifier controller for determining a magnitude of the gain used in the amplifier, wherein the determination is based on a scan operation transition signal that is indicative of a change in direction of motion of a scan motor, and wherein the amplifier controller includes:
   (i) an amplitude controller that is configured to receive the scan operation transition signal and to generate an amplitude control signal in response thereto; and
   (ii) a motor controller that is configured to transmit the scan operation transition signal to the amplitude controller substantially simultaneously with transmission of a transition control signal from the motor controller to the scan motor.

2. The system of claim 1 further comprising:
a high-signal level detector configured to indicate that the amplified signal has surpassed a saturation level of the amplifier.

3. The system of claim 1 further comprising:
a low-signal level detector configured to indicate that the amplified signal has fallen below a low-level threshold for output from said amplifier.

4. The system of claim 3 wherein the low-level threshold for said amplifier is indicative of an output level from said amplifier below which a signal-to-noise ratio in insufficient for accurate interpretation of the output.

5. The system of claim 1 wherein the amplifier comprises:
a feedback resistance circuit responsive to the amplifier control signal from the amplitude controller to control the gain of the amplifier.

6. The system of claim 5 wherein the feedback resistance circuit comprises:
a first resistor fixedly connected in parallel with an operational amplifier (op-amp); and
a second resistor that is configured to be placed into or out of a parallel connection with said op-amp, based on a status of the amplifier control signal; and
a switch responsive to the amplifier control signal to connect or disconnect the second resistor from the feedback resistance circuit.

7. The system of claim 5 wherein the feedback resistance circuit comprises:
a continuously adjustable resistor responsive to the amplifier control signal to adjust a magnitude of a resistance connected in parallel with an op-amp.

8. A method for controlling an amplifier in a bar code reader, the method comprising:
receiving light at a photodiode within said bar code reader from a bar code being scanned by a scan mirror powered by a scan motor;
converting the received light into an initial electrical signal;
determining, based on a scan operation transition signal, whether or not a change in direction of motion of the scan motor has occurred, wherein:
  (i) the scan operation transition signal is transmitted from a motor controller to an amplitude controller, and
  (ii) the scan operation transition signal is transmitted substantially simultaneously with transmission of a transition control signal from the motor controller to the scan motor;
establishing a gain value for the amplifier based on an outcome of the determining step; and
amplifying the initial electrical signal into an amplified signal using the established gain value.

9. The method of claim 8 wherein the establishing step is performed by the amplitude controller, and wherein an input of the amplitude is in communication with an output of the motor controller.

10. The method of claim 9 further comprising:
maintaining the amplifier gain value at a level between a low-level detection threshold and a high-level detection threshold.

11. A method controlling an amplifier in a circuit of a bar code reader, the method comprising:
coupling a low-level detector and a high-level detector to an output from said amplifier;
establishing a logical "1" initial value for the low-level detector and a logical "0" initial state for the high-level detector;
determining whether a first signal indicative of a transition between successive scan operations is high or low, wherein:
  (i) the first signal is transmitted from a motor controller to an amplitude controller, and
  (ii) the first signal is transmitted substantially simultaneously with transmission of a second signal from the motor controller to the scan motor; and
setting a gain value for the amplifier based on values of the low-level detector signal, the high-level detector signal, and the scan operation transition signal.

12. The method of claim 11 further comprising:
increasing the amplifier gain only if the amplifier gain is low and the low-level detector signal is high.

13. The method of claim 11 further comprising:
decreasing the amplifier gain only if amplifier gain is high and the high-level detector signal is high.

* * * * *

UNITED STATES PATENT AND TRADEMARK OFFICE
CERTIFICATE OF CORRECTION

PATENT NO. : 9,177,187 B2
APPLICATION NO. : 14/387439
DATED : November 3, 2015
INVENTOR(S) : Mitsuaki Hirono et al.

It is certified that error appears in the above-identified patent and that said Letters Patent is hereby corrected as shown below:

On The Title Page, Item (73) Assignee should read –

-- (73) Assignees: OPTOELECTRONICS CO., LTD., Saitama, (JP)
OPTICON, INC., Renton, WA --

Signed and Sealed this
Twenty-ninth Day of March, 2016

Michelle K. Lee
*Director of the United States Patent and Trademark Office*